(12) United States Patent  
Akiyama

(10) Patent No.: US 7,067,463 B2
(45) Date of Patent: Jun. 27, 2006

(54) PIVOT ASSEMBLY BEARING

(75) Inventor: Motoharu Akiyama, Nagano-ken (JP)

(73) Assignee: Minebea Co., Ltd., Nagano-ken (JP)

(*) Notice: Subject to any disclaimer, the term of this patent is extended or adjusted under 35 U.S.C. 154(b) by 274 days.

(21) Appl. No.: 10/365,075

(22) Filed: Feb. 12, 2003

(65) Prior Publication Data

US 2003/0158052 A1    Aug. 21, 2003

(30) Foreign Application Priority Data

Feb. 13, 2002    (JP) .............................. 2002-035919

(51) Int. Cl.
*C10M 169/04*    (2006.01)
(52) U.S. Cl. ...................... 508/363; 508/364; 508/379; 508/433; 508/438; 508/552; 384/206; 384/213
(58) Field of Classification Search ................ 508/552, 508/363
See application file for complete search history.

(56) References Cited

U.S. PATENT DOCUMENTS

| | | | | |
|---|---|---|---|---|
| 5,358,342 A | * | 10/1994 | Frisbee et al. | 384/213 |
| 5,728,020 A | | 3/1998 | Muranaka et al. | 474/199 |
| 5,856,281 A | * | 1/1999 | Otsuka et al. | 508/552 |
| 6,037,314 A | * | 3/2000 | Kondo et al. | 508/363 |
| 6,319,880 B1 | * | 11/2001 | Okaniwa et al. | 508/168 |
| 6,355,602 B1 | * | 3/2002 | Okaniwa et al. | 508/168 |
| 6,403,538 B1 | * | 6/2002 | Ozaki et al. | 508/367 |
| 6,531,431 B1 | * | 3/2003 | Mohri et al. | 508/551 |
| 6,730,639 B1 | * | 5/2004 | Miyamoto et al. | 508/364 |
| 6,794,342 B1 | * | 9/2004 | Komiya et al. | 508/485 |

FOREIGN PATENT DOCUMENTS

JP        9-72403       3/1997

* cited by examiner

*Primary Examiner*—Ellen M. McAvoy
(74) *Attorney, Agent, or Firm*—Flynn, Thiel, Boutell & Tanis, P.C.

(57) ABSTRACT

A pivot assembly bearing used in an information storage device maintains its capabilities for a longer period of time under frequent quick starting and stopping by containing a grease composition made up of a base oil, a thickener and an extreme-pressure agent.

7 Claims, 1 Drawing Sheet

PIVOT ASSEMBLY BEARING

RELATED APPLICATIONS

This application claims all rights of priority to Japanese Patent application No. 2002-035919, filed on Feb. 13, 2002.

FIELD OF THE INVENTION

This invention relates to a pivot assembly bearing for an information storage device of information equipment. In such information equipment, information is stored in or read out from a disk 5 by means of a magnetic head 4 supported by a head actuator 3 as shown in FIG. 1. A pivot assembly bearing 1 supported by a supporting part pivots the actuator head 3 so as to move the magnetic head 4 to a predetermined position. The pivot assembly bearing supports a shaft 6 by means of an upper bearing 1-1 and a lower bearing 1-2 as shown in FIG. 2.

BACKGROUND OF THE INVENTION

There has been conventionally used a grease composition for a pivot assembly bearing of information equipment which comprises a base oil a of mineral oil, ester, carbonic acid ester type, etc., a thickener and an additive not containing an extreme-pressure agent. As a conventional hard disk is large in size and small in information density, a pivot assembly bearing has worked gently without considering actuation thereof under a severe condition.

In the case of a recent small-sized, high speed and high density hard disk, however, it is required for a pivot assembly bearing to move quickly within a short distance in a short time, so that the bearing is heavily loaded due to repetition of quick starting and stopping.

SUMMARY OF THE INVENTION

Accordingly, it is an object of the invention to provide a pivot assembly bearing of long term durability against repeated quick starting and stopping.

The invention relates to a pivot assembly bearing sealed with a grease composition comprising a base oil, a thickener and an extreme-pressure agent. In particular, it has been found that an effective pivot assembly bearing of long term durability against repeated quick starting and stopping can be obtained by sealing therein a grease composition which comprises a mineral oil and a synthetic hydrocarbon oil containing a base oil having a dynamic viscosity of 40 to 80 $mm^2/s$, preferably 50 to 70 $mm^2/s$ at 40°, a ureic thickener and an extreme-pressure agent.

PREFERRED EMBODIMENTS OF THE INVENTION

Figure 1:
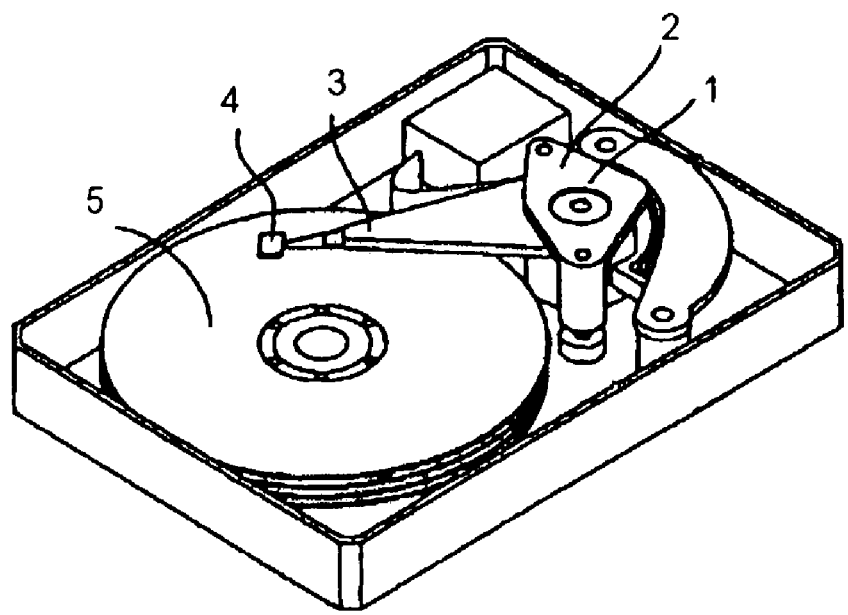
FIG. 1 is a schematic illustration of a pivot assembly of an information storage device.
Figure 2:
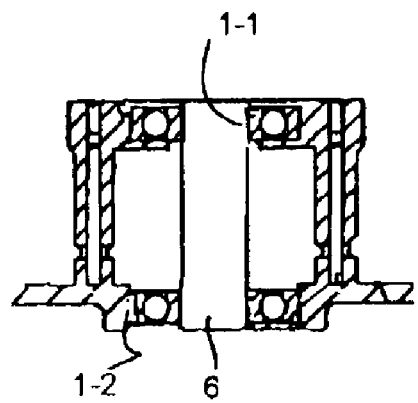
FIG. 2 is a cross section of a pivot assembly bearing.

A mineral oil and synthetic hydrocarbon oil are preferably used for a base oil in the invention.

A mineral oil used in the invention includes one or a mixture of not less than two of a naphthenic mineral oil, paraffin mineral oil, hydrogenated mineral oil, destructively hydrogenated mineral oil, solvent-purified mineral oil and highly purified mineral oil.

It is not preferable that the dynamic viscosity at 40° of a synthetic hydrocarbon oil used in the invention is 50 $mm^2/s$ or less, or more than 70 $mm^2/s$, because a grease composition thereof splashes over and leaks from the bearing to reduce its life, or the rotational torque thereof increases to cause an energy loss.

A synthetic hydrocarbon oil used in the invention may be prepared by mixing various commercially available poly-α-olefins (PAO) so as to meet the above mentioned requirements.

Such α-olefins include an oligomer such as a dimer, trimer, tetramer, etc. of 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicocene, 1-dococene and the like. Desirable in particular is an oligomer such as a dimer, trimer, tetramer, etc. of 1-decene, above all.

A mass ratio of mineral oil to synthetic hydrocarbon oil in the base oil used in the pivot assembly bearing of the invention is 1:0.5 to 2, and preferably 1:0.7 to 1.5.

A thickener used in the grease composition of the invention is a ureic compound and preferably a diurea compound having two urea bonds in a molecule. In particular, a diurea compound having an aliphatic or alicyclic group as an end group is preferable.

Such a thickener is added to adjust the consistency of a grease composition to be used, although its content is generally about 8 to 18% by mass.

An extreme-pressure agent used in the invention includes an organic molybdenum compound, organic fatty acid compound, and organic phosphorus compound, etc.

A molybdenum compound is added to the grease composition for the purpose of improving the bearing properties, i.e., the thus added compound is absorbed on the surface of bearing metal to form a film, which increases the anti-seizing properties, load bearing properties and resistance to wear even under a high-load and low-speed condition.

As a typical organic molybdenum compound used in the invention, there is preferably used a molybdenum thiophosphate represented by the following general formula:

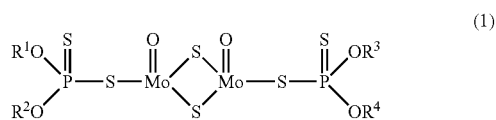

(1)

wherein $R^1$, $R^2$, $R^3$ and $R^4$ are an alkyl group having 1 to 24 carbon atoms or an arlyl group having 6 to 30 carbon atoms, respectively, and/or molybdenum dithiocarbamate represented by the following general formula:

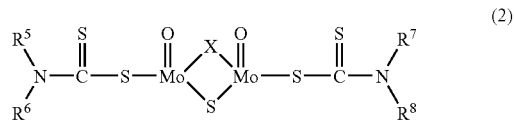

(2)

wherein $R^5$, $R^6$, $R^7$ and $R^8$ are an alkyl group having 1 to 24 carbon atoms, respectively, and X is O or S.

Further, there may be used dihydrocarbyl dithiophosphate metal compounds, dihydrocarbyl dithiocabamate metal compounds, naphtenic acid salts, etc., the metal being preferably zinc, tin, cadmium, antimony and the like. These metals may also be used together, if necessary. The above mentioned dihydrocarbyl dithiophosphate metal compounds include, for example, zinc dimethyl dithiophosphate, zinc butylisooctyl dithiophosphate, zinc di(4-methyl-2-pentyl) dithiophosphate, zinc di(tetrapropenyl-phenyl) dithiophosphate, zinc (2-ethyl-1-hexyl) dithiophosphate, zinc (isooctyl) ditho-phospate, zinc (ethylphenyl) dithiophosphate, zinc (amyl) dithiophosphate, zinc di-(hexyl) dithiophosphate, etc.

An organic aliphatic acid compound used in the invention includes oleic acid, naphthenic acid, abietic acid, lanolin aliphatic acid, succinic acid, amino acid derivatives, etc. Alkenyl succinic acid or its anhydride is preferable as a succinic acid compound, which conveniently absorbs on a rolling and sliding surface of the bearing material to form a film. Further, succinic acid derivatives also behave in a similar manner as described above.

Such succinic acid derivatives include succinic acid, alkyl succinic acid, succinic acid alkyl half ester, alkenyl succinic acid, succinic acid alkenyl half ester, succinimide, etc. These succinic acid derivatives may be used alone or in combination.

Phosphorous ester is preferable as an organic phosphide compound and includes those esters having a hydrocarbon group, such as trioctyl phosphite, triphenyl phosphite, tricresyl phosphite, bis-2-ethylhexyl phosphite, tridecyl phosphite, dibutyl hydrogen phosphite, tris(nonylphenyl) phosphite, dilauryl hydrogen phosphite, diphenyl monodecyl phosphite, trilauryl trithiophosphite and diphenyl hydrogen phosphite.

Further, orthophosphoric acid esters may also be used in the invention, which include tripheny phosphate, triethyl phosphate, tributyl phosphate, tris(2-ethylhexyl) phosphate, tris(2-ethylhexylyl) phosphate, tridecyl phosphate, diphenyl mono(2-ethylhexylyl) phosphate, tricresyl phosphate, trioctyl phosphate, tristearyl phosphate, etc.

An acidic phosphoric ester may also be used in the invention. Preferable acidic phosphoric esters include, for example, methyl acid phosphate, isopropyl acid phosphate, butyl acid phosphate, 2-ethylhexyl acid phosphate, isodecyl acid phosphate, dodecyl acid phosphate, lauryl acid phosphate, etc.

An amount of the extreme-pressure agent comprising the above mentioned organic molybdenum compound, organic fatty acid compound and organic phosphorus compound is 0.2 to 5% by mass and desirably in particular 1 to 2% by mass of the total grease composition.

The object of the invention is hardly achieved in an amount less than 0.2% by mass, while a large quantity of corrosive gas is inconveniently generated over an amount of 5% by mass.

The grease composition used in the invention may further comprise a conventional antioxidant, rust preventing agent, corrosion inhibitor, oiliness improving agent, etc.

The antioxidant includes phenolic or aromatic amine compounds, e.g., 2,6-di-tert-butyl-4-methylphenol as a phenolic antioxidant and p,p'-dioctyldiphenylamine as an amine antioxidant.

These antioxidants may either be used alone or as a mixture of two or more of them and are suitably added in an amount of 0.5 to 5% by mass of the grease composition.

The grease composition used in the invention may be prepared in a conventionally well-known manner.

Embodiments of the invention will be summarized as in the following.

1. A pivot assembly bearing sealed with a grease composition comprising a base oil, thickener and extreme-pressure agent.

2. The pivot assembly bearing described in the above item 1 in which the base oil containing a mineral oil and a synthetic hydrocarbon oil and having a dynamic viscosity of 40 to 80 mm$^2$/s at 40° is used.

3. The pivot assembly bearing described in the above item 1 in which a mass ratio of mineral oil:synthetic hydrocarbon oil is 1:0.5 to 2.

4. The pivot assembly bearing described in any one of the above items 1 to 3 in which the synthetic hydrocarbon oil is a poly-α-olefin (PAO).

5. The pivot assembly bearing described in any one of the above items 1 to 4 in which the poly-α-olefin (PAO) is one or not less than two oligomers of 1-decene selected from a group consisting of a dimer, trimer, tetramer, etc.

6. The pivot assembly bearing described in any one of the above items 1 to 5 in which the thickener is a urea compound.

7. The pivot assembly bearing described in any one of the above items 1 to 6 in which the extreme-pressure agent is one or not less than two compounds selected from a group consisting of a molybdenum compound, organic fatty acid compound and organic phosphorus compound.

8. The pivot assembly bearing described in any one of the above items 1 to 6 in which the molybdenum compound is molybdenum dithiophosphate and/or molybdenum dithiocarbamate.

9. The pivot assembly bearing described in any one of the above items 1 to 6 in which the organic phosphorus compound is tricresyl phosphate.

This invention will be further described in detail in the following examples.

EXAMPLES

A base oil having dynamic viscosity of 52 to 53 mm$^2$/s at 40° was prepared by mixing a naphthenic mineral oil and a 1-decene oligomer as a synthetic hydrocarbon oil in a mass ratio of 1:1.

Further, a base oil having a dynamic viscosity of 55 to 56 mm$^2$/s at 40° was prepared by mixing a paraffin mineral oil and a 1-decene oligomer as a synthetic hydrocarbon oil in a mass ratio of 1:1.

An alicyclic-aliphatic mixed diurea compound as a thickener was prepared by reacting 5 moles of diphenylmethane 4,4'-diisocyanate, 3 moles of cyclohexylamine and 7 moles of stearylamine and used in an amount of 12 to 14% by mass of total grease composition.

Further, lithium stearate as a thickener was used in an amount of 12 to 14% by mass of total grease composition.

As the extreme-pressure agent, there were used molybdenum compounds of molybdenum dithiophosphate ($R^1$, $R^2$, $R^3$ and $R^4$ of the general formula as shown previously represent an alkyl group having 1 to 10 carbon atoms or aryl group having 6 carbon atoms, respectively) and molybdenum dithiocarbamate ($R^5$, $R^6$, $R^7$ and $R^8$ of the general formula as shown previously represent an alkyl group having 1 to 8 carbon atoms, respectively and X is O).

Tricresyl phosphite preferable as an organic phosphorus compound, was also used as the extreme-pressure agent.

These extreme-pressure agents were used in an amount of 1 to 2% by mass of total grease composition.

An antioxidant of the amine type and a rust preventing agent of the sulfonic acid and sulfonate type were used as a stabilizer in an amount of 2 to 5% by mass of total grease composition to yield grease products.

Compositions of these grease products are shown in Table 1.

COMPARATIVE EXAMPLES

Comparative grease compositions were prepared in a similar manner as described above without adding any extreme-pressure agent.

TABLE 1

| Example | Base Oil | | | Thickener | Extreme-pressure Agent | Stabilizer | 4-Ball Test |
|---|---|---|---|---|---|---|---|
| Ex.1 | naphthen | PAO | 1:1 | diurea | MDC 1% | A-S-E | ◉ |
| Ex.2 | paraffin | PAO | 1:1 | diurea | MDC 2% | A-S-E | ◉ |
| Ex.3 | naphthen | PAO | 1:1 | diurea | phoshite | A-S-E | ◉ |
| Ex.4 | paraffin | PAO | 1:0.8 | diurea | MDP 2% | A-S-E | ◉ |
| Ex.5 | naphthen | PAO | 1:1.5 | diurea | MDC 2% | A-S-E | ◉ |
| Ex.6 | carbonic acid ester | | | St-Li | MDC 2% | A-S-E | ◉ |
| Ex.7 | polyol ester | | | St-Li | MDP 2% | A-S-E | ◉ |
| Com.Ex.1 | naphthen | PAO | 1:1 | diurea | none | A-S-E | Δ |
| Com.Ex.2 | carbonic acid ester | | | St-Li | none | A-S-E | ○ |
| Com.Ex.3 | polyol ester | | | St-Li | none | A-S-E | X |

Diurea: alicyclic-aliphatic mixed diurea compound
St-Li: lithium stearate
Phosphite: tricresyl phosphite
MDC: molybdenum dithiocarbamate
MDP: molybdenum dithiophosphate
A-S-E: antioxidant of amine type and rust preventing agent of sulfonic acid and sulfonate type
4-ball Test: diameter of wear scar caused by foul-ball test at 4.0 kg · f load and 1,200 rpm for one hour
◉ less than 0.6μ;
○ less than 0.7μ;
Δ less than 0.8μ;
X_0.8μ or more Properties Test of Grease Compositions Four-Ball Test Four-ball test was carried out at 4.0 kg·f load and 1,200 rpm for one hour and the diameter of the wear scar was measured.

Pivoting Test of Pivot Assembly Bearing

Pivot assembly bearings were sealed with grease compositions and subjected to a pivoting test under the following condition:

test machine: 3.5 inch-HDD actuator
seek angle: full
number of seeking times: $10^8$ seeks
frequency: 12 Hz
temperature: ordinary temperature
evaluation items: torque (before starting the test; after $10^7$ seeks; after $5 \times 10^7$ seeks and after $10^8$ seeks), and maximum torque (2 rpm for 30 seconds)
visual evaluation of lubricity after $10^8$ seeks: excellent/good/moderate/poor
State of disassembled bearings: excellent/good/moderate/poor Bearing properties of pivot assembly bearings of the invention are shown in Table 2.

TABLE 2

| | Maximum Torque (g · cm) and Appearance | | | | | | | | Lubricity after |
|---|---|---|---|---|---|---|---|---|---|
| Example | no seek | | $10^7$ seeks | | $5 \times 10^7$ seeks | | $10^8$ seeks | | $10^8$ seeks |
| Ex.1 | 0.545 | ◉ | 0.400 | ◉ | 0.600 | ◉ | 0.752 | ◉ | ◉ |
| Ex.2 | 0.540 | ◉ | 0.403 | ◉ | 0.611 | ◉ | 0.784 | ◉ | ◉ |
| Ex.3 | 0.531 | ◉ | 0.411 | ◉ | 0.602 | ◉ | 0.772 | ◉ | ◉ |
| Ex.4 | 0.551 | ◉ | 0.402 | ◉ | 0.599 | ◉ | 0.713 | ◉ | ◉ |
| Ex.5 | 0.503 | ◉ | 0.444 | ◉ | 0.609 | ◉ | 0.744 | ◉ | ◉ |
| Ex.6 | 0.540 | ◉ | 0.451 | ◉ | 0.663 | ◉ | 0.801 | ○ | ○ |
| Ex.7 | 0.650 | ◉ | 0.403 | ◉ | 0.602 | ◉ | 0.779 | ○ | ○ |
| Com.Ex.1 | 0.536 | ◉ | 0.424 | ◉ | 0.864 | ○ | 0.925 | Δ | Δ |
| Com.Ex.2 | 0.543 | ◉ | 0.477 | ○ | 0.751 | Δ | 0.886 | X | X |
| Com.Ex.3 | 0.650 | ◉ | 0.441 | ○ | 0.754 | Δ | 0.911 | X | X |

Appearance: evaluation by disassembly:
◉ excellent;
○ good;
Δ moderate;
X poor
Lubricity after $10^8$ seeks:
◉ excellent;
○ good;
Δ moderate;
X poor It is clear from these Tables 1 and 2 that pivot assembly bearings sealed with a grease composition comprising a base oil, thickener and extreme-pressure agent exhibit excellent results in the long-term pivoting durability test. Particularly, it is demonstrated that a pivot assembly bearing sealed with a grease composition comprising a base oil containing a mineral oil and synthetic hydrocarbon oil and having a dynamic viscosity of 40 to 80 mm$^2$/s, and preferably 50 to 70 mm$^2$/s at 40°; a ureic thickener; and an extreme-pressure agent can withstand long-term service even when quick starting and stopping are repeated.

It has been found that the pivot assembly bearing of the invention exhibited a stable torque over a long period of time as shown in Tables 1 and 2, which makes it possible to extend its life and withstand its tong-term service against repeated quick starting and stopping. It has also been found that the present pivot assembly bearing does not cause a fretting phenomenon.

What is claimed is:

1. In an information storage device for storing and/or reading out information on a disk by means of a magnetic head supported by a head actuator and pivoted by a pivot assembly bearing, the improvement comprising said pivot assembly bearing being sealed with a grease composition comprising a base oil having a dynamic viscosity of 40 to 80 mm$^2$/sec at 40° C. and containing a mineral oil and a synthetic hydrocarbon oil in a mass ratio of mineral oil: synthetic hydrocarbon oil of 1:0.5 to 1:2, a thickener and an extreme pressure agent.

2. The information storage device of claim 1, wherein the synthetic hydrocarbon oil is a poly-α-olefin.

3. The information storage device of claim 2, wherein the poly-α-olefin is at least one mixed oligomer selected from the group consisting of a dimer, trimer and tetramer.

4. The information storage device of claim 1, wherein the thickener is a urea compound.

5. The information storage device of claim 1, wherein the extreme pressure agent is at least one compound selected from the group consisting of a molybdenum compound, an organic fatty acid compound and an organic phosphorus compound.

6. The information storage device of claim 5, wherein the molybdenum compound is at least one of molybdenum dithiophosphate and molybdenum dithiocarbamate.

7. The information storage device of claim 5, wherein the organic phosphorus compound is tricresyl phosphate.

* * * * *